United States Patent
Hagen

(10) Patent No.: US 9,987,920 B2
(45) Date of Patent: Jun. 5, 2018

(54) METHOD FOR OPERATING A FUEL TANK DEVICE FOR A MOTOR VEHICLE AND CORRESPONDING FUEL TANK DEVICE

(71) Applicant: AUDI AG, Ingolstadt (DE)

(72) Inventor: Harald Hagen, Creussen (DE)

(73) Assignee: AUDI AG, Ingolstadt (DE)

( * ) Notice: Subject to any disclaimer, the term of this patent is extended or adjusted under 35 U.S.C. 154(b) by 0 days. days.

(21) Appl. No.: 14/979,880

(22) Filed: Dec. 28, 2015

(65) Prior Publication Data

US 2016/0185208 A1 Jun. 30, 2016

(30) Foreign Application Priority Data

Dec. 29, 2014 (DE) ........................ 10 2014 227 017

(51) Int. Cl.
*F02M 25/08* (2006.01)
*F16K 24/04* (2006.01)
(Continued)

(52) U.S. Cl.
CPC ....... *B60K 15/03519* (2013.01); *F02M 25/08* (2013.01); *F02M 25/089* (2013.01);
(Continued)

(58) Field of Classification Search
CPC .. F02M 25/089; F02M 25/0836; F02M 25/08; F02M 25/0845; Y10T 137/0379;
(Continued)

(56) References Cited

U.S. PATENT DOCUMENTS 5,046,702 A * 9/1991 Miyazawa .......... F16K 31/0655
137/625.48
5,259,412 A 11/1993 Scott et al.
(Continued)

FOREIGN PATENT DOCUMENTS

| CN | 101670778 A | 3/2010 |
|---|---|---|
| DE | 19620037 | 11/1997 |
| DE | 102009048134 | 4/2011 |
| DE | 102012005996 | 10/2013 |

OTHER PUBLICATIONS

Chinese Search Report dated Nov. 3, 2017 with respect to counterpart Chinese patent application 20151078881741.
(Continued)

*Primary Examiner* — Atif Chaudry
(74) *Attorney, Agent, or Firm* — Henry M. Feiereisen LLC

(57) ABSTRACT

A method for operating a fuel tank device for a motor vehicle, with a fuel tank to which a tank ventilation line is assigned, and with a tank shutoff valve for adjusting a flow-through cross section of the tank ventilation line is disclosed. The method includes impinging the tank shutoff valve with a first electric voltage for adjusting a first flow-through cross-section of the tank ventilation line and impinging the tank shutoff valve with a second electric voltage for adjusting a second flow-through cross section of the tank ventilation line; when switching from the first flow-through cross section to the second flow-through cross section and/or vice versa, impinging the tank shutoff valve for a defined transition time period with a transition voltage which lies between the first voltage and the second voltage.

10 Claims, 1 Drawing Sheet

(51) Int. Cl.
    *B60K 15/035* (2006.01)
    *F16K 17/196* (2006.01)
    *B60K 15/03* (2006.01)

(52) U.S. Cl.
    CPC ....... *F02M 25/0836* (2013.01); *F16K 17/196* (2013.01); *F16K 24/04* (2013.01); *B60K 2015/03302* (2013.01); *B60K 2015/03514* (2013.01); *F02M 2025/0845* (2013.01); *Y10T 137/0379* (2015.04); *Y10T 137/776* (2015.04); *Y10T 137/7761* (2015.04)

(58) Field of Classification Search
    CPC ........... Y10T 137/776; Y10T 137/7761; F16K 17/196; F16K 24/04; B60K 15/03519; B60K 2015/03514; B60K 2015/03302
    See application file for complete search history.

(56) References Cited

U.S. PATENT DOCUMENTS

| | | | |
|---|---|---|---|
| 6,069,784 A | 5/2000 | Doden | |
| 2011/0079738 A1 | 4/2011 | Hagen | |
| 2012/0168454 A1* | 7/2012 | Hagen | B60K 15/03519 220/746 |
| 2012/0180760 A1* | 7/2012 | Hagen | B60K 15/03519 123/434 |

OTHER PUBLICATIONS

Translation of Chinese Search Report dated Nov. 3, 2017 with respect to counterpart Chinese patent application 20151078881741.

* cited by examiner

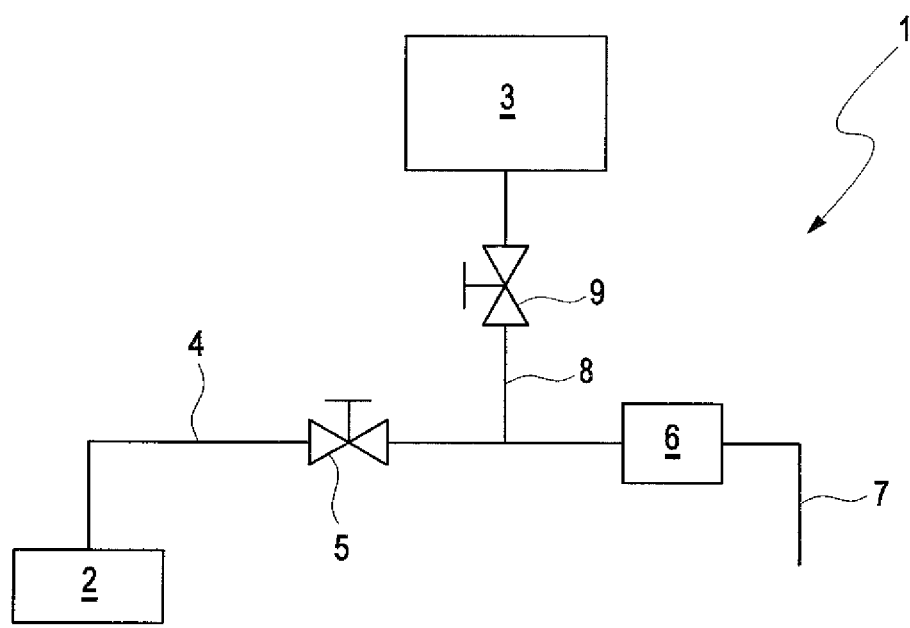

METHOD FOR OPERATING A FUEL TANK DEVICE FOR A MOTOR VEHICLE AND CORRESPONDING FUEL TANK DEVICE

CROSS-REFERENCES TO RELATED APPLICATIONS

This application claims the priority of German Patent Application, Serial No. 10 2014 227 017.0, filed Dec. 29, 2014, pursuant to 35 U.S.C. 119(a)-(d), the disclosure of which is incorporated herein by reference.

BACKGROUND OF THE INVENTION

The invention relates to a method for operating a fuel tank-device for a motor vehicle, with a fuel tank to which a tank ventilation line is assigned, and with a tank shutoff valve for adjusting a flow-through cross section of the tank ventilation line, wherein the tank shutoff valve can be or is impinged with a first electric voltage for adjusting a first flow-through cross section, and with a second electric voltage for adjusting a second flow-through cross-section. The invention also relates to a fuel tank device.

The following discussion of related art is provided to assist the reader in understanding the advantages of the invention, and is not to be construed as an admission that this related art is prior art to this invention.

In motor vehicles a fuel tank device of the above type is for example assigned to the motor vehicle or forms a component of the motor vehicle. It serves in particular for receiving or temporarily storing an operating medium, for example the fuel. For this purpose the fuel tank device has a fuel tank, in which the fuel can be stored. During operation of the internal combustion engine the fuel is withdrawn from the fuel tank and is conducted to the internal combustion engine for operation of the internal combustion engine.

For example due to environmental influences it may be necessary to ventilate the fuel tank, i.e., to discharge a gas, for example a fuel-air-mixture, from the tank. This is in particular the case when the internal combustion engine is a component of a hybrid drive device, because the internal combustion engine oftentimes has standstill phases in which it is not operated. Correspondingly the fuel or the fuel-air-mixture is not withdrawn from the fuel tank, at least not through a fuel line.

For ventilating the fuel tank, the tank ventilation line is provided, which is assigned to the fuel tank. The tank ventilation line is fluidly connected with the fuel tank or an interior of the fuel tank, so that the gas contained in the fuel tank can be discharged through the tank ventilation line, for example in the direction of an external environment of the motor vehicle and/or in the direction of the internal combustion engine. For performing the ventilation in a controlled manner the tank shutoff valve is provided. The latter serves for adjusting a desired flow-through cross-section of the tank ventilation line. By means of the tank shutoff valve, the tank ventilation line can be completely blocked, wherein the flow-through cross section is equal to zero, or at least partially, in particular completely released.

For adjusting the desired flow-through cross-section the tank shutoff valve is impinged with a corresponding electric voltage. For example for adjusting the first flow-through cross-section the first electric voltage is used and for adjusting the second flow-through cross-section the second electric voltage is used. The second flow-through cross-section is hereby different from the first flow-through cross-section; Also the second electric voltage is different from the first electric voltage.

For example the first flow-through cross-section is equal to zero, so that when the first flow-through cross-section is given, the tank ventilation line is completely blocked. The second flow-through cross-section corresponds for example to a completely open tank ventilation line and thus to a maximal flow-through cross-section. The first electric voltage can also be equal to zero, while the second electric voltage causes the opening of the tank ventilation line, in particular a complete opening.

It would be desirable and advantageous to provide a method for operating a fuel tank device for a motor vehicle, which, is improved compared to other methods and in particular improves the acoustics of the tank shutoff valve and/or increases the service life of the tank shutoff valve.

SUMMARY OF THE INVENTION

According to one aspect of the present invention, a method for operating a fuel tank device for a motor vehicle, with a fuel tank to which a tank ventilation line is assigned, and with a tank shutoff valve for adjusting a flow-through cross section of the tank ventilation line, where the method includes impinging the tank shutoff valve with a first electric voltage for adjusting a first flow-through cross-section of the tank ventilation line and impinging the tank shutoff valve with a second electric voltage for adjusting a second flow-through cross section of the tank ventilation line; when switching from the first flow-through cross section to the second flow-through cross section and/or when switching from the second flow-through cross section to the first flow-through cross section, impinging the tank shutoff valve for a defined transition time period with an transition voltage which lies between the first voltage and the second voltage, wherein the transition voltage is maintained for the defined transition time period and the duration of the transition time period and/or the transition voltage is selected in dependence on multiple state variables, where the state variables include a temperature and a pressure. Thus, when the flow-through cross-section of the tank shutoff valve or the tank ventilation line is to be changed, a switching is performed from the first voltage or the second voltage to a target voltage, i.e., the second voltage or the first voltage.

This switching, however, does not occur immediately. Rather it is first switched from the starting voltage to the transition voltage, which is subsequently maintained for the defined transition time period. Only then a target voltage is set. The transition voltage is hereby between the first voltage and the second voltage. Of course the transition voltage can be selected variable, so that for example during the transition time period, the transition voltage is changed, in particular continuously or stepwise, starting from the starting voltage up to the target voltage. For example the transition voltage is changed during the entire transition time period starting from the starting voltage up to the target voltage, in particular continuously or stepwise.

In this way an abrupt opening or closing of the tank shutoff valve and thus a high mechanical stress can be avoided. The described method can on one hand be used during the switching from the first flow-through cross section to the second flow-through cross section, i.e., preferably when opening the tank shutoff valve, as well as when switching from the second flow-through cross-section to the first flow-through cross-section, i.e., for example when closing the tank shutoff valve.

For example an effective voltage is used as voltage, which is set by means of pulse width modulation at the tank shutoff valve. While it can of course be provided to change the voltage, which is applied to the tank shutoff valve itself, the use of pulse width modulation is significantly easier to realize. Within the framework of the pulse width modulation a voltage, in particular an onboard grid voltage, is present at the tank shutoff valve during a time period defined a duty cycle. The duty cycle is determined from the corresponding voltage, i.e., the first voltage, the second voltage or the transition voltage.

As an alternative or in addition the transition voltage, which lies between the first voltage and the second voltage, can also be realized by means of an electric circuit, in particular by means of at least one capacitor, at least one diode and/or at least one resistor.

According to another advantageous feature of the invention, the transition voltage is selected so that an equilibrium between an actuating force directed towards changing the flow-through cross-section and a holding force directed towards retaining the flow-through cross-section is established. The actuating force is hereby achieved by application of the electric voltage to the tank shutoff valve. The holding force is for example based on a spring force, a tank pressure, an inertia force and/or a fixing of the tank shutoff valve. The transition voltage is selected so that the flow-through cross-section does not, or only insignificantly, change in spite of applying the transition voltage to the tank shutoff valve. Preferably it is thus provided that only when applying the target voltage, i.e., for example the first voltage or the second voltage, an actual change of the flow-through cross-sectional occurs.

In particular, the holding force depends on the spring force and a pressure force caused by the tank pressure. This pressure force is for example measured by means of a pressure sensor. At least approximately the holding force can be determined as the sum of the spring force and the pressure force. The pressure force results for example from a pressure difference over the tank shutoff valve, i.e., in particular from the pressure difference between the tank pressure, in particular an internal tank pressure, and an ambient pressure. When the actuating force is smaller than the holding force or corresponds to the holding force, the tank shutoff valve preferably maintains its current flow-through cross section. When the tank shutoff valve is configured as a valve, which is closed when not provided with current, it can be provided that the tank shutoff valve assumes its smallest flow-through cross-section, in particular the first flow-through cross-section, when the actuating force is smaller than the holding force. However, when the actuating force exceeds the holding force, the flow-through cross-section changes, for example in the direction of the second flow-through cross-section.

According to another advantageous feature of the invention, the duration of the transition time period and/or the transition voltage can be selected in dependence on at least one state variable. The above mentioned holding force usually depends on the state variable, which for example reflects environmental conditions. Thus, the holding force is for example dependent on a temperature and/or a pressure, in particular an internal tank pressure. While for example the duration of the transition time period and/or the transition voltage can be constant, they are preferably determined variable in dependence on the state variable.

For example it is provided to first set the transition voltage to a defined value and then modify the transition voltage in dependence on the state variable. This can preferably be accomplished with a characteristic diagram, a table and/or a mathematical relationship. The transition voltage in particular in the latter case is thus a function of the defined value and the state variable. Hereby the defined value or the initially selected transition voltage according to the descriptions above can have a defined course. In particular the value is varied over the transition time period, for example the entire transition time period, starting from the starting voltage in the direction of the target voltage, preferably continuously or stepwise. Subsequently the value is modified by means of the state variable.

According to another advantageous feature of the invention, a temperature, in particular a fuel temperature or a ambient temperature, is used as state variable. The use of the temperature as state variable was described above. The temperature can for example be the fuel temperature or the ambient temperature. Also a temperature determined from these temperatures, for example an average temperature, can be used as state variable.

According to another advantageous feature of the invention, a pressure, in particular an internal tank pressure, or a pressure difference, in particular the pressure difference between the internal tank pressure and the ambient pressure is used as the state variable. The use of a pressure as state variables was mentioned above. The pressure can for example be the internal tank pressure. As an alternative also the pressure difference can be used as state variable, wherein for example the pressure difference describes the difference between the pressure and a reference pressure. In this case the pressure is for example the internal tank pressure, while the reference pressure is the ambient pressure.

According to another advantageous feature of the invention, the duration of the transition time period is selected the longer the lower the temperature is. A magnetic field induction of the tank shutoff valve depends on the temperature. In particular the magnetic field induction is the smaller the higher the temperature is. However, this also means vice versa that at lower temperatures a relatively great magnetic field induction this present. In order to nevertheless achieve a soft switching of the tank shutoff valve, the duration of the transition voltage is selected longer. Thus, while a first duration is selected at a first temperature, a second duration, which is longer than the first duration, is selected at a second temperature, which is smaller than the first temperature.

In addition or as an alternative the transition voltage can be selected the lower, the lower the temperature is. This is also based on the above description that the magnetic field induction depends on the temperature. At the first temperature the first transition voltage is selected, while at the second temperature, which is smaller than the first temperature, the second transition voltage is selected, the second transition voltage being smaller than the first transition voltage.

According to another advantageous feature of the invention, the duration of the transition time period is selected the longer the greater the pressure is. The longer duration of the transition time period enables a slower decrease of the pressure, in particular the internal tank pressure. At a first pressure a first duration of the transition time period is used. At a second pressure, which is greater than the first pressure, a second duration is used, which is longer than the first duration.

According to another advantageous feature of the invention, the transition time period is selected the greater, the greater the pressure is. The greater the pressure, for example the internal tank pressure, the greater the holding force usually is. This means that a greater actuating force is required in order to cause an adjustment of the flow-through cross-section. At the first pressure the first transition voltage is selected, while at the second pressure which is greater than the first pressure, a second transition voltage is used, which is greater than the first transition voltage.

The invention also relates to a fuel tank device for a motor vehicle, in particular for implementing the method according to the above explanations, with a fuel tank, to which a tank ventilation line is assigned, and with a tank shutoff valve for adjusting a flow-through cross-section of the tank ventilation line, wherein the tank shutoff valve is impinged with a first electric voltage for adjusting a first flow-through cross-section and with a second electric voltage for adjusting a second flow-through cross-section. Hereby it is provided that when switching from the first flow-through cross-section to the second flow-through cross-section or vice versa the fuel tank device is configured to initially impinge the tank shutoff valve for a defined transition time period with a transition voltage which lies between the first voltage and the second voltage.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows a schematic representation of a fuel tank device according to the invention.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a schematic representation of a fuel tank device 1, which is for example provided for use with a motor vehicle. The fuel tank device 1 has a fuel tank 2, in which fuel can be temporarily stored. The fuel serves for example for driving the internal combustion engine 3. Assigned to the fuel tank 2 is a tank ventilation line 4, which extends from the fuel tank 2. In the tank ventilation line 4 a tank shutoff valve 5 is arranged by means of which a flow-through cross-section of the tank ventilation line 4 can be adjusted. In particular the tank shutoff valve 5 is impinged with a first electric voltage for adjusting a first flow-through cross section and with a second electric voltage for adjusting a second flow-through cross section.

On a side of the tank ventilation line 4, which faces away form the fuel tank, the tank ventilation line enters into a filter device 6, for example an activated carbon filter. Also entering the filter device 6 is an air intake line 7, preferably on a side of the filter device 6, which faces away from the entry side of the tank ventilation line 4 into the filter device 6. Via the air intake line 7 for example a fluid connection between an external environment and the filter device 6 is established.

Fluidly between the fuel tank 2 and the filter device 6, in particular fluidly between the tank shutoff valve 5 and the filter device 6, a purge line 8 enters into the tank ventilation line 4. On the side of the purge line 8 which faces away from the tank ventilation line 4, the purge line 8 is fluidly connected to the internal combustion engine, in particular to an intake manifold of the internal combustion engine. In the purge line 8 a purge valve 9 is provided by means of which a flow-through cross-section of the purge line 8 can be adjusted.

In particular during a standstill time period of the internal combustion engine 3 that the fuel tank 2 may have to be ventilated, in particular due to excessive pressure in the fuel tank. For this purpose the tank shutoff valve 5 is opened at least partially, in particular entirely, at closed purge valve 9, so that gas, for example a fuel-air-mixture, can enter into the filter device 6 from the fuel tank 2 through the tank ventilation line 4. There the fuel is filtered from the fuel-air-mixture. Subsequently the fuel remains in the filter device 6.

When now the internal combustion engine 3 is operated, the fuel can be conducted during a purge operation from the filter device 6 in the direction of the internal combustion engine 3. For this purpose the purge valve 9 is opened, while preferably simultaneously the tank shutoff valve 5 is closed. Correspondingly air can enter through the air intake line 7 into the filter device 6, where it takes up the fuel, and reaches the internal combustion engine 3 in form of a fuel-air-mixture. There the fuel-air-mixture is combusted.

In particular in order to avoid high mechanical stress on the tank shutoff valve 5, it is provided that when switching from the first flow-through cross-section to the second flow-through cross section, the tank shutoff valve 5 is impinged for a defined transition time period with a voltage, which lies between the first voltage and the second voltage.

The duration of the transition time period and/or the transition voltage are hereby selected in dependence on at least one state variable. Particularly preferably multiple state variables are used. The state variable is for example a temperature or a pressure. As temperature for example a fuel temperature can be used, while as pressure the internal tank pressure is used. The duration of the transition time period or the transition voltage or both are determined as a function of the temperature, the pressure or as a function of both or are used subsequently when switching from the first flow-though cross section to the second flow-though cross section.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating a fuel tank device for a motor vehicle, with a fuel tank to which a tank ventilation line is assigned, and with a tank shutoff valve for adjusting a flow-through cross section of the tank ventilation line, said method comprising:

adjusting a flow-through cross-section of the tank ventilation line by varying an electric voltage to the tank shut-off valve including applying a first electric voltage to adjust the flow-through cross section to a first flow-through cross section and applying a second electric voltage to adjust the flow-through cross section to a second flow-through cross section and providing soft switching of the tank shutoff valve and prevent abrupt closing and opening of the tank shutoff valve during switching of the tank ventilation line flow-through cross section between the first flow-through cross section and the second flow-through cross section by applying a transition voltage to the tank shut-off valve for a defined transition time period, wherein the transition voltage lies between the first voltage and the second voltage;

controlling the transition voltage by an electric circuit between the first voltage and the second voltage such that first a switching is performed from a starting voltage to the transition voltage, then the transition voltage is maintained for a defined transition time period, and then a target voltage is set; and selecting the transition voltage being dependent on multiple state variables including a temperature and a pressure.

2. The method of claim 1, wherein the transition voltage is selected so that an equilibrium between an actuating force directed to changing the flow-through cross section and a holding force directed to maintaining the flow-through cross section is established.

3. The method of claim 1, wherein a fuel temperature or an environmental temperature is used as the temperature.

4. The method of claim 1, wherein an internal tank pressure or a pressure difference is used as the pressure.

5. The method of claim 4, wherein the pressure difference is a difference between an internal tank pressure and an ambient pressure.

6. The method of claim 1, wherein the duration of the transition time period is selected the longer the lower the temperature is.

7. The method of claim 1, wherein the transition voltage is selected the smaller the lower the temperature is.

8. The method of claim 1, wherein the duration of the transition time period is selected the longer the greater the pressure is.

9. The method of claim 1, wherein the transition voltage is selected the greater the pressure is.

10. A fuel tank device for a motor vehicle, comprising:
a fuel tank;
a tank ventilation line assigned to the fuel tank; and
a tank shutoff valve for adjusting a flow-through cross-section of the tank ventilation line, wherein the tank shutoff valve is configured to cause a first flow-through cross section of the tank ventilation line in response to application of a first voltage to the tank shutoff valve, and to cause a second flow-through cross-section of the tank ventilation line in response to application of a second voltage to the tank shutoff valve, said tank shutoff valve configured to provide soft switching of the tank shutoff valve and prevent abrupt closing and opening of the tank shutoff valve during switching of the tank ventilation line flow-through cross section between the first flow-through cross-section and the second flow-through cross-section by applying a transition voltage to the tank shut-off valve for a defined transition time period, wherein the transition voltage lies between the first voltage and the second voltage, and
an electric circuit to control the transition voltage between the first voltage and the second voltage such that first a switching is performed from a starting voltage to the transition voltage, then the transition voltage is maintained for a defined transition time period, and then a target voltage is set;
wherein the transition voltage is dependent on multiple state variables including a temperature and a pressure is selected.

* * * * *